Nov. 7, 1972   R. J. EVANS   3,702,137
LATCHING MECHANISM
Filed June 4, 1970   3 Sheets-Sheet 2

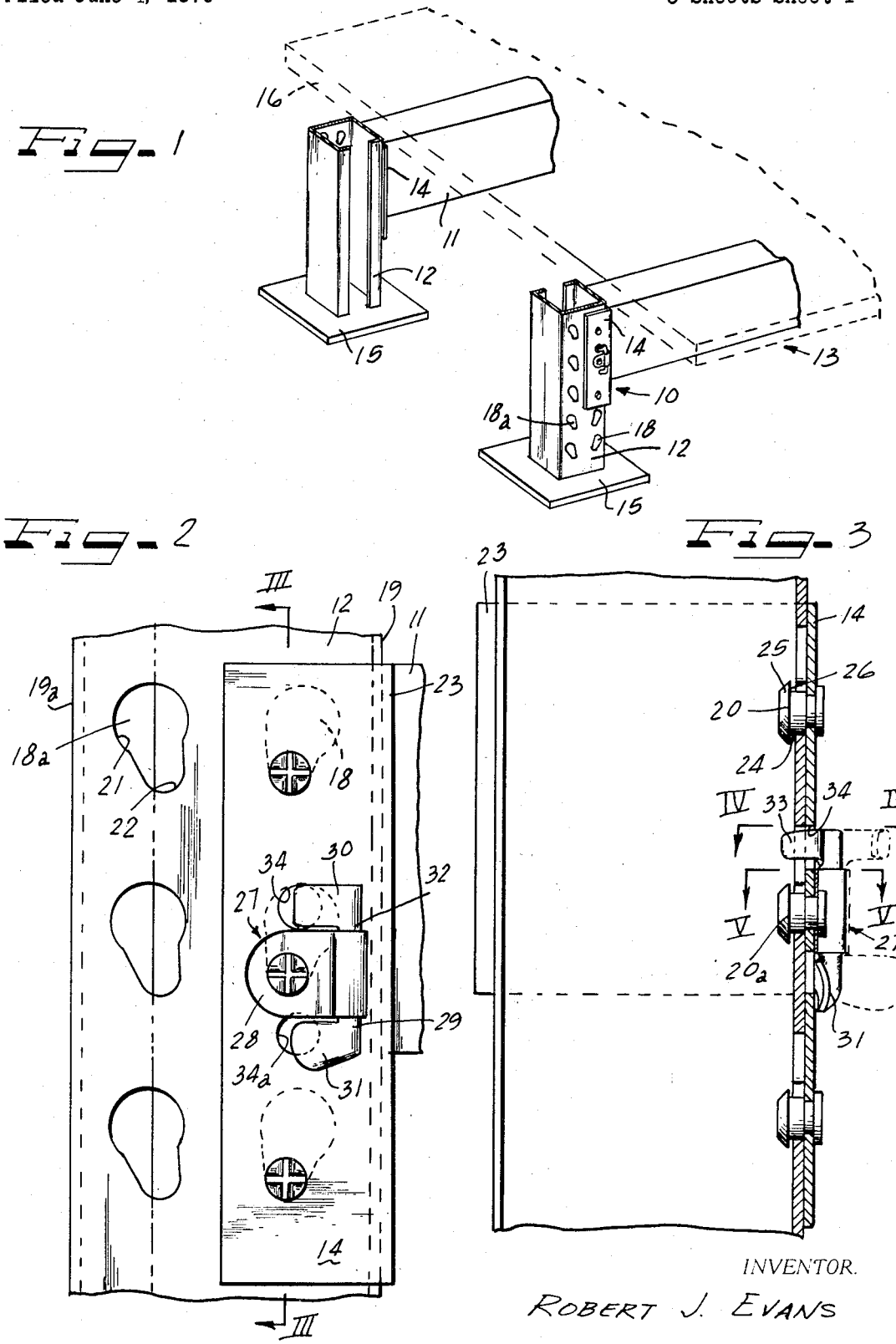

INVENTOR.
ROBERT J. EVANS
BY   ATTORNEYS

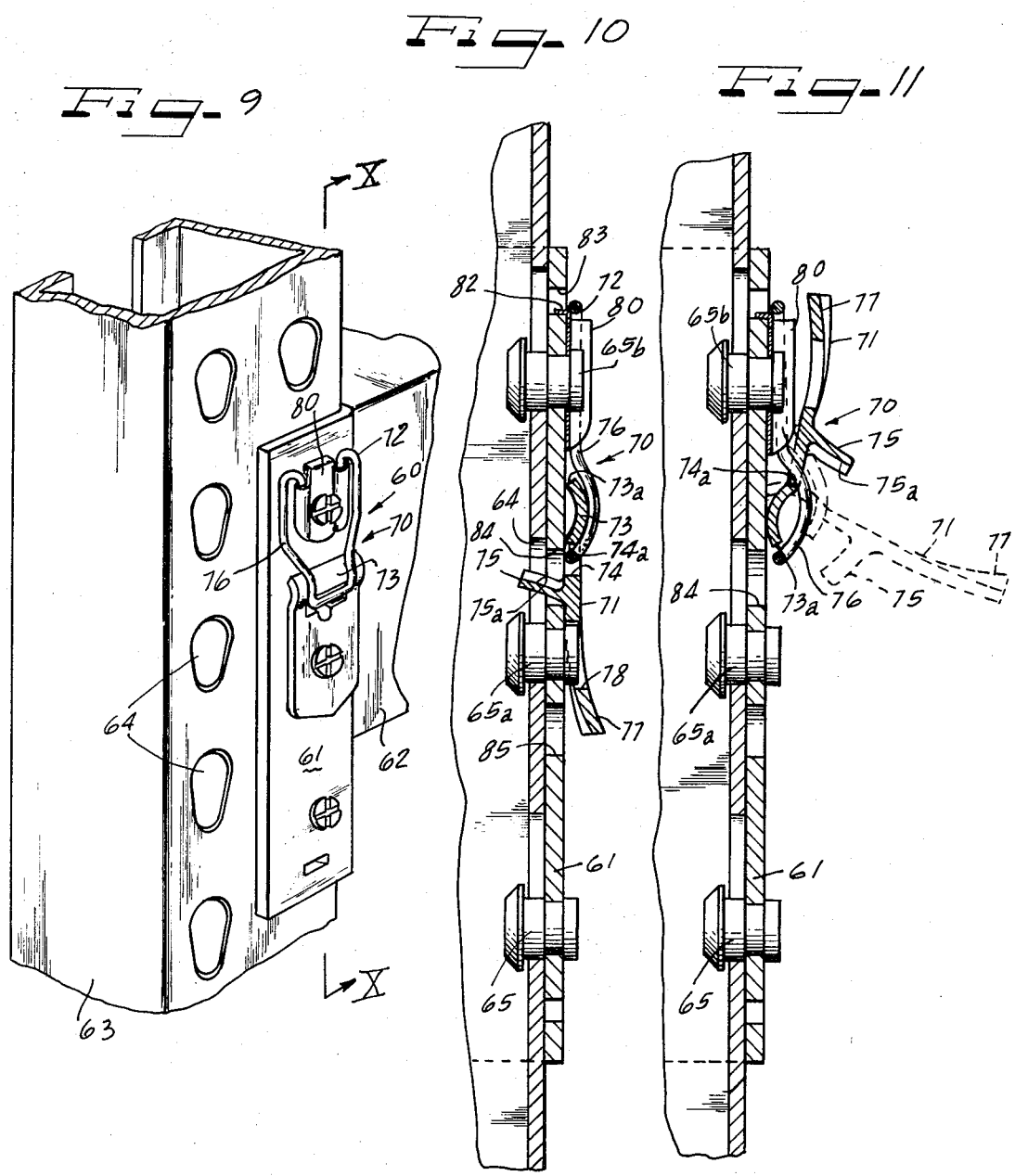

United States Patent Office 3,702,137
Patented Nov. 7, 1972

3,702,137
LATCHING MECHANISM
Robert J. Evans, Aurora, Ill., assignor to
Aurora Equipment Co., Aurora, Ill.
Continuation-in-part of application Ser. No. 849,427,
Aug. 12, 1969. This application June 4, 1970, Ser.
No. 43,514
Int. Cl. A47f 5/107
U.S. Cl. 211—176
15 Claims

ABSTRACT OF THE DISCLOSURE

A latching mechanism adapted to adjustably and releasably connect two supporting members of a structure such as a pallet rack. The latching mechanism includes one structural member having headed connecting elements spaced therealong and another structural member having spaced slots or apertures having a wide portion for receiving the headed connecting element and a narrow portion preventing the removal of the connecting element once they are inserted therein. To prevent the accidental disengagement of the headed connecting element from the slot, a safety locking means is provided and comprises a locking finger or projection of a locking member which is mounted by a bracket for movement into and out of a position with the locking finger or projection extending into the wide portion of one of the slots to prevent movement of the connecting elements into that portion. To prevent accidental movement of the locking member, two embodiments of the device provide an irregular cross-section to form a cam portion engaged by a resilient portion of the mounting bracket which portions coact with each other to oppose movement of the locking member to withdraw the locking finger. In the other embodiment illustrated, the mounting bracket has a detent which is received in a groove on the locking member when the finger is in a locking position but during movement of the locking member from the locking position, the detent engages the locking member to oppose rotation thereof.

CROSS REFERENCES TO RELATED APPLICATION

This application is a continuation-in-part of my copending application Ser. No. 849,427, filed Aug. 12, 1969, now abandoned.

BACKGROUND OF THE INVENTION

Field of the invention

This invention relates to connecting systems for support members and more particularly to the construction of a latching mechanism having a key clamp with a locking projection to prevent accidental disengagement of the key clamp.

Prior art

Adjustable racks or frames utilizing an adjustable connection between horizontal and vertical members with the vertical member having a plurality of spaced keyhole slots with a wide portion for receiving a headed connecting element or stud and a narrow portion preventing the removal of the stud while engaged with the edges of the narrow portion have had problems such as the connecting elements being moved into the wide portion during the loading of articles in the rack and therefore causing accidental disengagement of the connection of the members of the rack or structure. To eliminate this problem various safety devices have been provided. An example is a pin which is mounted on a leaf-type spring which urges the pin into a wide portion of the slot to prevent the connecting element occupying the slot from moving into the wide portion. While such a locking member prevents the accidental disengagement of the connecting means or joint, these existing safety structures have not proved satisfactory due to damage to the spring element during the assembly and disassembly of the joint. Furthermore, the holding of the locking element in the withdrawn position against the force of the spring during a disassembly operation is cumbersome and greatly increases the time required for making an adjustment in the connection.

SUMMARY OF THE INVENTION

The present invention provides a connecting structure having a pair of support members one of which is provided with spaced connecting elements receivable in spaced slots having wide portions and narrow portions in the other support member, and a safety means including a mounting means enabling movement of a locking member which has a locking element or finger that extends into a wide portion of one of the slots to prevent removal of the connecting element therefrom. The locking member is movable between a position with the locking element or finger disposed in a locking position and a position in which the element or finger is withdrawn from the wide portion of the slots to enable assembly and disassembly of the connecting elements. In the preferred embodiment, the locking element has a portion coating with a resilient portion of the mounting means to resist the movement of the locking member from the position with the locking element or finger in the locking position.

BRIEF DESCRIPTION OF THE DRAWINGS

FIG. 1 is an isometric view with portions broken away for the purpose of illustration of a rack assembly having support means interconnected by the connecting means of the present invention;

FIG. 2 is an enlarged plan view of the interconnection of the support means by the present invention;

FIG. 3 is a cross-sectional view taken along the lines III—III of FIG. 2;

FIG. 9 is an isometric view of an interconnection of a pair of support means by a third embodiment of the invention;

FIG. 10 is a cross-sectional view taken along lines X—X of FIG. 9; and

FIG. 11 is a cross-sectional view similar to FIG. 10 with the locking member in a withdrawn position.

DESCRIPTION OF THE PREFERRED EMBODIMENTS

Figure 4:
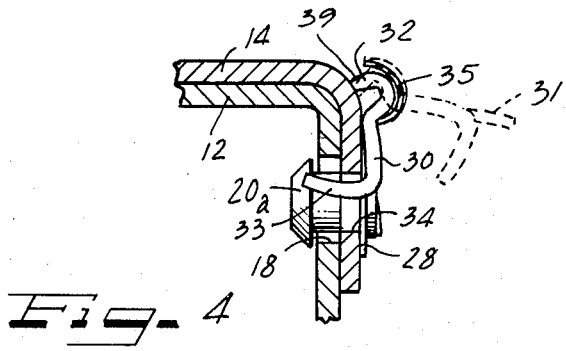
FIG. 4 is a cross-sectional view taken along the lines IV—IV of FIG. 3.

Although the principles of the present invention are of utility in any latching mechanism they are particularly useful when incorporated in an adjustable storage rack or the like and the illustrative embodiment herein shown illustrates the novel connecting means used in a pallet rack structure.

Other features and advantages of the invention will be readily apparent from the following description of certain preferred embodiments thereof taken in conjunction with the drawings, although variations and modifications may be effected without departing from the spirit and scope of the concept of the disclosure.

The principles of the present invention are illustrated in a connecting means or system generally indicated at 10 for detachably interconnecting a horizontal support member 11 to a vertical support member or column 12 of a pallet rack assembly generally indicated at 13. The horizontal support member 11, which is illustrated as being of rectangular cross-section, may be an I-beam, a channel member, or metal member bent in a Z-shaped cross-sectional configuration and has its end attached to an L-shaped flange member element 14.

Each of the vertical support members 12 is illustrated as a rectangular shaped channel member having one end mounted on a base 15. Supported on the pair of horizontal members 11 is a platform or decking generally indicated in broken lines at 16. The platform 16 may be a pallet which is adapted to be lifted or transferred by conventional means such as a fork lift truck and may be provided with runners to hold the surface above the horizontal support members 11 a sufficient distance to allow the insertion and removal of the prongs of the fork lift truck. The vertical columns 12 may be provided with means to maintain the horizontal distance therebetween such as a structural cross member not illustrated.

The connecting means 10 is formed by providing rows of spaced slots or apertures 18 and 18a along the sides 19 and 19a, respectively, of the vertical column 12 and by providing spaced connecting elements or studs 20 (FIG. 3) which are received in the slots 18. As best shown in FIGS. 2 and 3, the slots 18 have a wide portion 21 connected to a narrow portion 22. The center line of the slots or apertures 18 is inclined with respect to the side 19 of the column 12 so that the narrow portion 22 is offset towards the center of the column 12 with respect to the wide portion 21. Thus the fastening elements 20 when moved from the wide portion 21 into the narrow portion 22 draws a leg or flange 23 of the flange member 14 into snug engagement with the side 19 of the column 12.

The connecting elements 20 are attached to flange member 14 and have a portion 24 of a diameter to be received in the narrow portion 22 of the slot 18 and a head portion 25 of greater diameter than the narrow portion 22 but of a slightly smaller diameter than the wide portion 21. Thus, a surface 26 of a head 25 engages the wall of the column 12 adjacent the edges of the narrow portion 22 as the connecting element or stud 19 is moved into the narrow portion 22. As mentioned above, the movement of the studs 20 from the wide portion into the narrow portion 22, causes lateral movement of the flange element 14 resulting in the leg 23 engaging the side 19 of the vertical support member 12.

In order to prevent the accidental upward movement of the flange member 14, which carries the studs 20, a safety means or locking means generally indicated at 27 is provided and includes a bracket 28 forming a mounting means for a locking member 29 which is illustrated in FIG. 2 as being U-shaped. The locking member 29 of the embodiment illustrated in FIGS. 2–5 is a sheet metal member having a U-shaped configuration with a pair of legs 30 and 31 interconnected by a bight portion or main portion 32. As best illustrated in FIG. 4, the leg 30 has its end bent into a locking finger or element which extends through an aperture 34 in the flange member 14 and into the wide portion 21 of the slot or aperture 18 to prevent the accidental upward movement of the stud 20 out of the narrow portion 22 of the slot 18 (FIG. 3). The leg 31 of the locking member 29 is preferably shaped to provide a gripping means or lever for rotating the locking member from a first or locking position to a disengaged position illustrated in FIGS. 3 and 4 in broken lines.

Figure 5:
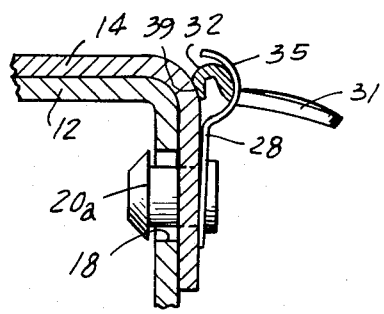
FIG. 5 is a cross-sectional view taken along the lines V—V of FIG. 3.

The bracket 28 is of a resilient material and has a resilient curved portion 35 which rotatably engages the bight portion 32 of the locking member 29. As best illustrated in FIGS. 4 and 5, the bight portion or engageable portion 32 has been bent to provide an irregular cross-section so that the rotation of the locking member 29 is opposed by the spring action of the mounting bracket 28. As illustrated, the mounting bracket 28 is preferably attached to the flange member 14 by the deformed head of the center stud 20a, which head also secures the stud 20a to the flange member 14. The coaction of the irregular cross-section of the bight portion 32 with the resilient characteristics of the mounting bracket 28 resists rotation of the locking member in the bracket 28 from the first or locking position to the second or unlocking position with the locking element or finger 33 withdrawn from the wide portion of the slot 18 and the aperture 34.

The coaction of the mounting bracket 28 with the locking element 29 biases and holds the locking finger 33 in the locking position with the locking member 29 being substantially flat on the flange member 14 when the two structural members are interconnected by the connection or joint 10. However, once the locking element 29 has been moved to a position illustrated in FIGS. 4 and 5 to withdraw the locking finger 33, the coaction of the mounting bracket 28 with the locking member 29 tends to hold the locking member in the unlocked position. In other words, the rotation of the locking member 29 in the bracket 28 causes an increase in the spring pressure on the locking member 29 which pressure decreases once the locking member has reached the position such as illustrated in FIG. 5. Thus, the greatest spring pressure opposing rotation of the locking member is exerted as the locking member 29 is initially moved from the locking position illustrated in FIG. 4.

The locking member 29 is preferably made from a sheet metal part which has the finger 33 bent from the leg 30 and has the leg 31 shaped to provide a gripping means for rotating the member 29. The main or bight portion 32 has been shaped to provide the irregular cross-section with a flat surface 39 to engage the surface of the member 14 when in the second position which cross-section coacts with the bent portion 35 of the mounting bracket 28. To install the safety means or locking means 27 on the flange member 14, the bracket 28 is positioned on the stud 20a while the locking member is positioned with its bight portion 32 received in the bent portion 35. The stud is then deformed or headed to attach the stud 20a and the bracket 28 along with the locking member 29 to the flange member 14. It should be noted that the safety means 27 illustrated in the drawings is operable only with a row of slots or apertures 18 along the side 19 of the column 12. In order for the flange member 14 to be operative with the slots 18a along the side 19a, the locking member 29 must be configured so that the locking finger 33 will extend through the aperture 34a, or in other words the leg 30 is moved to position of the leg 31 while the leg 31 is moved to position the leg 30.

Figure 6:
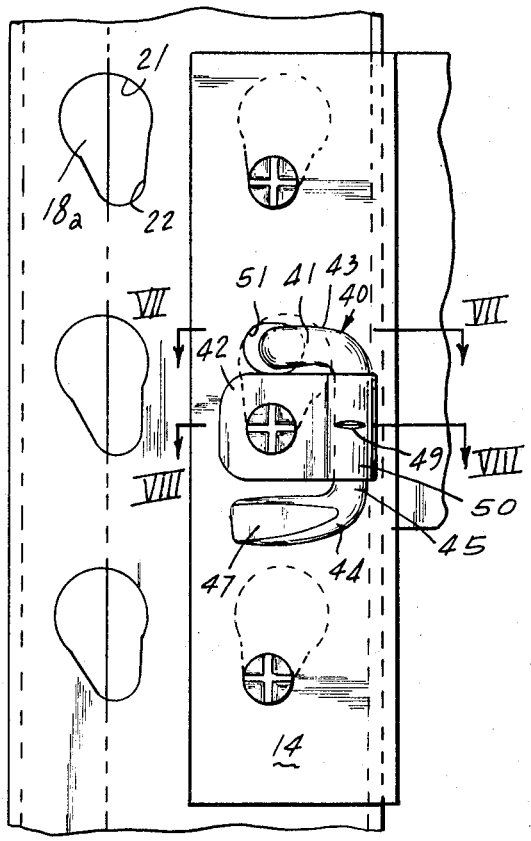
FIG. 6 is an enlarged plan view of an interconnection of a pair of support means by a second embodiment of the present invention.
Figure 7:
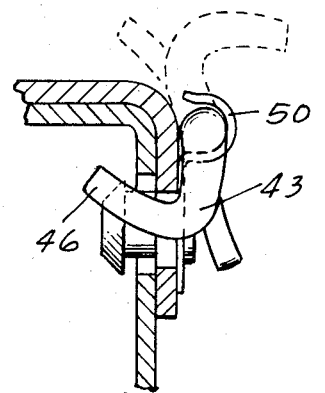
FIG. 7 is a cross-sectional view taken along the lines VII—VII of FIG. 6.
Figure 8:
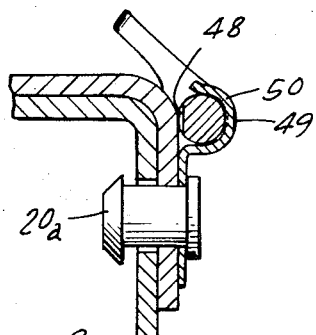
FIG. 8 is a cross-sectional view taken along the lines VIII—VIII of FIG. 6.

The embodiment of the connecting device illustrated in FIGS. 6–8 utilizes a safety means or locking means 40 which includes a U-shaped locking member 41 mounted on the flange member 14 by bracket or mounting means 42. The locking member 41 has a pair of legs 43 and 44 interconnected by a bight or engageable portion 45. The locking member 41 is preferably made out of heavy gauge wire or rod which is bent to form the legs 43 and 44 and the leg 43 has its end bent to form a locking finger or element 46. The leg 44 is preferably deformed such as at 47 to form a lever or gripping means to rotate the locking member 41 in the bracket 42. The bight portion 45 is provided with a groove 48 which receives a detent 49 in a curved portion 50 of the bracket 42 when the locking member 41 is moved to the locking position with the finger 46 extending through an aperture 51 of the flange member 14 and extending through the wide portion 21 of the slot 18. The mounting bracket 42 rotatably engages the bight portion 45 of the locking member 41 and when the locking member 41 is rotated from the locking position illustrated in solid lines in FIG. 7, the detent 49 engages the outer surface of the bight portion 45 adjacent to the groove 48 to increase the frictional forces resisting the rotation of the locking member in the mounting bracket. The detent 49 and the groove 48 cooperate to form a means resisting the moveemnt of the locking member 41 from the locking position and provide a means for holding the locking member in the locking position.

As in the previously described embodiment, the safety means 40 is attached to the flange member 14 by positioning the bracket 42 on the stud 20a with the locking member received in the end portion 50. Then the stud is headed to attach the stud 20a and the locking means 40 to the flange 14. As in the previously described embodiment, the frictional force caused by the detent 49 of the bracket 42 resists the movement of the locking member 41 from the locking position illustrated in the figures. However, once the locking member 41 is rotated to an unlocking position such as illustrated in dash lines in FIG. 7, the detent 49 tends to hold the locking member in the withdrawn position.

A third embodiment of a connecting means or system which is the preferred embodiment of the latching mechanism is generally indicated at 60 in FIG. 9 for detachably interconnecting a flange member 61 of a horizontal support member 62 to a vertical support member 63. The column 63 is provided with rows of spaced slots or apertures 64 along each side. The apertures 64 are illustrated as being oblong with a wide portion and a narrow portion with the center line along the major axis of the apertures being substantially parallel to the side of the support member 63.

To form the connections between the flange member 61 and the vertical structural member 63, the flange member 61 has three connecting elements or studs 65 which are substantially the same construction as the connecting element 20 of the previously described embodiment. Each of the elements 65, as best illustrated in FIGS. 10 and 11, has a head portion which is movable through a wide portion of the slot 64 but will engage the narrow portion of each slot to prevent straight-line separation of the members.

To prevent the accidental disengagement of the connecting means or system 60, a safety means or locking means generally indicated at 70 is provided and includes a locking member 71 and a bracket or mounting means 72 for mounting the locking means on the flange member 61. The locking member 71 has an engagement portion 73 at one end defined by a slot 74 and a locking element or projection 75. As best illustrated in FIGS. 10 and 11, the end of the locking member which forms the portion 73 has been deformed to form a curved or cam surface which is engaged by a resilient spring portion or element 76 of the bracket means 72. The locking member 71 at an end opposite to the engagement portion 73 terminates in a tab portion 77 which enables an operator to grasp the locking member to cause it to move from a locking position to an unlocking position. In order to provide a flush alignment on the flange member 61, the member 71 is provided with an aperture 78 to receive a portion of the coupling element 65a.

The locking member 71 is formed from sheet metal with the one end being provided with a transversely extending deformed part to provide the curved cam surface for the engagement portion 73. Adjacent to the portion 73, the slot 74 is formed with a portion of the member 71 being deformed outwardly to form the locking element 75. Preferably, the locking element 75 is a projecting tongue which has a curved cross-section formed by a groove 75a created as the tongue is being forced to an outwardly projecting position. The other end of the locking member 71 is bent or deformed upwardly to form the tab portion 77 and if necessary the aperture 78 is formed for receiving the head of the coupling or connecting element 65a.

To anchor the spring elements 76 to a flange member 61 a bracket or anchor 80 of sheet metal is attached by a deformed portion of the coupling element 65b to the flange member 61. The bracket or anchor 80 grips ends of the spring member 76 and anchors these ends firmly to the flange member 61. However, these ends can be detached from the anchor member and ends of a similar spring member inserted if necessary. To prevent turning or rotating of the anchor 80 about the coupling element 65b, a tab 82 is bent from the anchor 80 and extends into a slot 83 of the flange member 61.

As in the previously described embodiments the flange member 61 is provided with spaced apertures 84 and 85 which are positioned or spaced from the connecting stud 65a so that one of the apertures 84 is in alignment with the wide portion of the slot 64 as the connecting elements 65 are in the narrow portion of the slots of the member 63. The mounting means 72 position the locking member 71 so that the locking element or projection 75 extends through the aperture 84 into the wide portion of the slot 64. As best illustrated in FIG. 10, the projection 75 extends at an angle so that upward moveemnt of the flange 61 causes the projection 75 to dig into the edge of the slot 64 and to be pulled further into a locking position. Thus, the edges of the projections 75 and the edge of the slot 64 act as cam means for camming the locking elements 75 into the locking position.

When in the locking position illustrated in FIG. 10, the locking member 71 by the coaction of the engagement portion 73 and spring element 76 is held or urged toward the locking position. To remove or withdraw the locking element 75 from the locking position, the member 71 is pivoted on edge 73a by lifting of the tab 77 from the surface of the flange member 61; however, the spring 76 coacting with the engagement portion 73 resists this movement and if the locking member 71 is released, the spring will force it back to the locking position. After the locking member has been pivoted past a certain position with the locking member extending substantially at right angles to the flange 61, the edge 73a has moved on the surface of the flange member 61 and the spring 76 extends into the slot 74 to act on the edge 74a of the engagement portion 73 to cause the locking member to be urged to the open position as illustrated in FIG. 11. Thus, the spring 76 and the engagement portion 73 act as a resilient overcenter spring with regards to the movement of the locking member 71.

In moving the locking member 71 to a locking position, from the position illustrated in FIG. 11, the springs 76 resist movement until the locking member has moved substantially past a perpendicular position with respect to the flange member 61. After moving past the perpendicular position the edge 73a has moved on the flange member 61 so that the spring 76 urges the locking member towards the locking position. The pivoting of the locking member 71 on the edge 73a, causes the locking element 75 to move in an arcuate path between the locking position and the unlocking or withdrawn position with the coaction of the spring 76 and the engageable portion initially resisting movement from either position.

Therefore, while assembling or disassembling a connection or joint utilizing the connection of this invention, the assembler disengages the safety means 27, 40 or 70 by moving the locking members 29, 41 or 71 to a disengaged or withdrawn position. Once the members have been moved to the disengaged position, they will remain there enabling the assembler to use both hands while disconnecting the structural member joined by the connecting system. When the joint or connection is completed between the structural members, the assembler moves the locking members 29, 41 or 71 into the locking position where the coaction between the respective locking members and their brackets maintain the locking finger or element in the locking position to prevent the disassembly of the joint regardless of the jolting or forces applied to the structural members.

Although various minor modifications might be suggested by those versed in the art, it should be understood that I wish to embody within the scope of the patent warranted hereon all such modifications that reasonably and properly come within the scope of my contribution to the art.

I claim as my invention:

1. A system for connecting a pair of support members which comprises a first support member and a second support member, said first member having vertically spaced slots, each of said slots having a wide portion and a narrow portion, said second member having vertically spaced studs with each of said studs having an enlarged head smaller than said wide portion and larger than said narrow portion so that said studs can be inserted into the wider portion of said slots and moved laterally to said narrow portion for engagement with the wall adjacent said narrow portion thereby preventing straight-line separation of said members, said second member having an aperture adjacent to at least one of said studs in position for alignment with said wide portion when said one stud is engaging the wall adjacent said narrow portion; and locking means including a bracket means attached to said second member and a locking member having a portion engageable by said bracket means, said locking member having a locking element spaced from said engageable portion and extending outwardly from said locking member, said bracket means mounting said locking member for movement with said locking element moving in an arcuate path between a first position with the locking element extending through said aperture into a wide portion to limit lateral movement between said first and second members and a second position withdrawn from said wide portion and said aperture enabling assembly and disassembly operations of said support members.

2. A system according to claim 1 wherein said bracket means and said locking member have means coacting to resist movement of said locking element from said first position.

3. A system according to claim 2, wherein said coacting means includes said bracket means having a resilient portion engaging said engageable portion of the locking member so that movement of the locking member from said first position to said second position is opposed by the resilient force of the bracket means.

4. A system according to claim 3, wherein said resilient portion is a resilient member detachably connected to the remaining portion of the bracket means.

5. A system according to claim 2, wherein said coacting means includes a groove on said engageable portion of the locking member coacting with a detent portion in the bracket means when said locking element is in the first position so that movement from said first position causes said detent to bear on the surface of the engageable portion adjacent to said groove to resist said movement.

6. A system according to claim 1, wherein said locking element is disposed on a leg portion extending from said engagement portion and wherein said locking member includes a second leg portion providing lever means for moving said member between said positions.

7. A system according to claim 6, wherein said leg portions and said engagement portion define a U-shaped member lying substantially in the same plane so that when said locking member is disposed in the first position said leg portions lie substantialy flat on the second structural member.

8. A connecting means for securing two structural members together in assembled relationship comprising:
a first structural member having spaced headed connecting element projecting from one face of said member,
a second structural member having spaced apertures having wide portions for enabling insertion of said headed elements therethrough and narrow portions for engaging said headed elements to prevent removal from said aperture, so that first and second members are assembled by inserting the head elements in the wide portions of said apertures and moving the inserted elements into the narrow portions, and
locking means disposed on said first member to prevent accidental disconnection of the headed connecting elements from said apertures, said locking means including a lock member having a locking element projecting therefrom and separate and individual bracket means having a resilient portion engaging a portion of the locking member to movably mount said locking member on a structural member with said locking element being movable in an arcuate path between a position with said locking element extending into the wide portion of one of said apertures of said second member and a second position withdrawn from said wide portion so that said structural member can be assembled and disassembled while said locking member is in said second position.

9. In a system for connecting a pair of support members utilizing spaced headed stud members inserted through spaced slots of a keyhole configuration, and having locking means including a locking element inserted in a wide portion of one of said keyhole slots to prevent the accidental disconnection of the support members, the improvement comprising said locking element being a projection on a locking member, and a separate and individual bracket means movably mounting said lock member with the locking element moving in an arcuate path between a position with the locking element disposed in a wide portion of one of the keyhole slots to prevent removal of said studs therefrom and a position with the locking element withdrawn from the wide portion enabling assembly and disassembly of the stud in the keyhole slot.

10. A pallet rack having a vertical and horizontal support member with the horizontal member connected to the vertical members by adjustable connecting connections comprising:
a first support member having spaced headed connecting elements extending from one side thereof receivable in spaced slots in the second member, said slots having a wide portion enabling the insertion of a headed connecting element therein and a narrow portion engaging the head of the connecting elements to prevent removal therefrom; and safety locking means including
a bracket means attached to one of said support members, said bracket means including a resilient portion, and a separate locking member having a locking element disposed thereon,
said locking member having a portion engaged by the resilient portion of the bracket means for mounting said locking member on said one support member for movement of the locking element in an arcuate path between a position with the locking element disposed in one of said spaced slots for preventing removal of the connecting elements therefrom and a second position withdrawn from said slots for enabling insertion and removal of the connecting elements from said slots.

11. A system for connecting a pair of support members which comprises:
a first support member having spaced headed connecting members thereon;
a second support member having spaced apertures, each aperture being capable of receiving one of said headed connecting members and having a portion for engaging the headed connecting member received therein as said first and second support members are moved laterally relative to each other thereby preventing straight line separation of said headed connecting members from the aperture to form a connection between said support members; and locking means mounted on one of said support members, said locking means having a bracket means with a resilient portion and a separate and individual locking member having a portion engaged by the resilient portion of the bracket means, said locking member having a locking element offset laterally from said engaged portion so that movement of the locking member relative to the bracket means moves said locking element in an arcuate path between a position with the locking element inserted into one of said apertures for preventing disengagement of the headed connecting members from said spaced apertures to a position withdrawn from said apertures for enabling the insertion and removal of the spaced headed connecting members from said spaced apertures during a disassembly and assembly operation.

12. A system for connecting a pair of support members which comprises:

a first support member having spaced headed connecting members thereon;

a second support member having spaced apertures, each aperture being capable of receiving one of said headed connecting members and having a portion for engaging the headed connecting member received therein as said first and second support members are moved relative to each other thereby preventing straight-line separation of said headed connecting members from the aperture to form a connection between said support members; and locking means mounted on one of said support members to prevent accidental disconnection of said spaced headed connecting members from said spaced apertures, said locking means including a mounting bracket having a resilient portion and a U-shaped locking member having a bight portion rotatably engaged by said mounting bracket, said locking member having a locking element disposed on one of its legs, so that rotation of said locking member moves said locking element between a position disposed in one of said spaced apertures to prevent disengagement of the connecting element therefrom to a position withdrawn from said spaced aperture enabling assembly and disassembly of the connecting members from the spaced apertures, and said bight portion of the locking member having an irregular cross-section so that movement of the locking member from the first position to the second position is resisted by said resilient portion.

13. A system according to claim 12, wherein said bight portion includes a flat surface engageable with a surface of said one support member as said locking member is moved to the withdrawn position to hold the locking member in said withdrawn position.

14. A system connecting a pair of support members which comprises:

a first support member having spaced headed connecting members thereon;

a second support member having spaced apertures, each aperture capable of receiving one of said headed connecting members and having a portion for engaging the headed connecting member received therein as said first and second support members are moved laterally relative to each other thereby preventing straight-line separation of said headed connecting members from its aperture to form a connection between said support members;

locking means mounted on one of said support members, said locking means having a mounting bracket and a U-shaped locking member, said locking member having legs connected by a bight portion with a locking element disposed on the end of one of said legs offset from said bight portion, said locking member being rotatably engaged by the mounting bracket and rotatable from a first position with the locking element disposed at one of said spaced apertures to prevent removal of a connecting element disposed therein and a second position withdrawn from said aperture enabling assembly and disassembly of the first and second support members, said bight portion of said locking member having a groove disposed thereon receiving a detent on the mounting bracket as the locking element assumes the first position, said detent engaging the bight portion during rotation of the locking member from said first position to resist rotation thereof.

15. A connecting means for securing two structural members together in assembled relationship comprising:

a first structural member having spaced headed connecting elements projecting from one face of said member, a second structural member having spaced apertures having wide portions for enabling insertion of said header elements therethrough and a narrow portion for engaging said headed elements to prevent removal from said aperture, said first and second support members are assembled by inserting the headed elements in the wide portions of the slots and moving the inserted elements into the narrow portions, and locking means disposed on said first member to prevent accidental disconnection of the headed connecting elements from said apertures, said locking means including a locking member and bracket means, said locking member having a portion engageable by the bracket means and a locking element spaced from said portion and projecting from said member, said bracket means including a resilient member engaging said engageable portion of the locking member and a mounting member removably securing the resilient member to said first structural means, said resilient portion urging said locking member to a position with the locking element disposed in a wide portion of an aperture of said second member to prevent disengagement of said first and second structural members, and resisting movement of said locking element from said position.

References Cited

UNITED STATES PATENTS

| | | | |
|---|---|---|---|
| 3,042,221 | 7/1962 | Rasmussen | 211—148 |
| 2,932,368 | 4/1960 | Schell | 211—148 X |
| 3,273,720 | 9/1966 | Seiz | 211—177 X |
| 3,303,937 | 2/1967 | McConnell | 211—148 |
| 3,346,126 | 10/1967 | Bloom | 211—176 |
| 3,414,224 | 12/1968 | Robilliard | 211—177 X |
| 3,456,970 | 7/1969 | Sunasky | 211—148 X |

NILE C. BYERS, JR., Primary Examiner

U.S. Cl. X.R.

108—144; 5—288; 211—148